April 21, 1942.  F. W. KNOTT ET AL  2,280,588
FLUID MOTOR
Filed Feb. 26, 1940
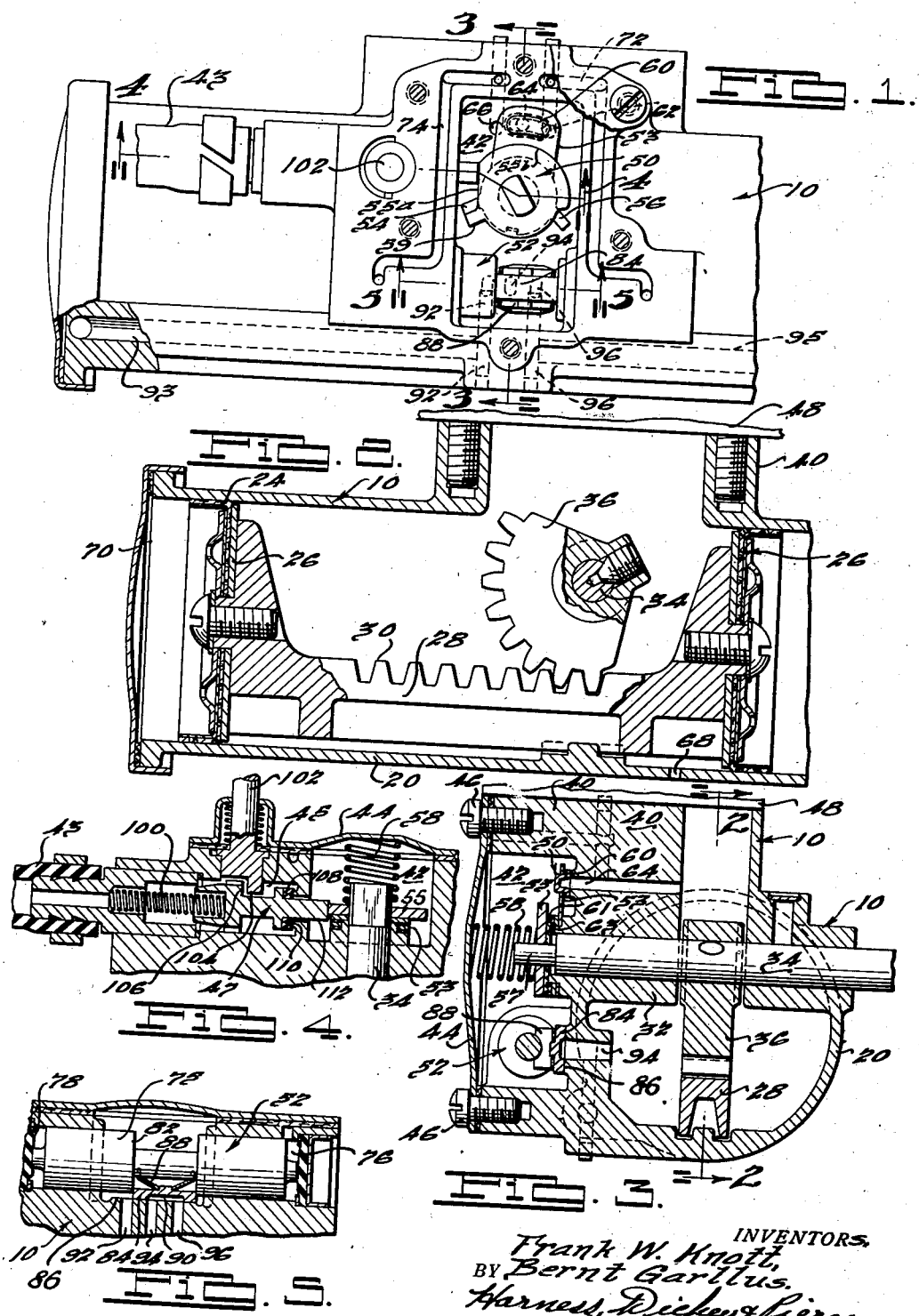
INVENTORS.
Frank W. Knott,
BY Bernt Gartlus.
Harness, Dickey & Pierce.
ATTORNEYS.

Patented Apr. 21, 1942

2,280,588

UNITED STATES PATENT OFFICE 2,280,588

FLUID MOTOR

Frank W. Knott and Bernt Garllus, Detroit, Mich.

Application February 26, 1940, Serial No. 320,760

4 Claims. (Cl. 121—159)

The present invention relates to fluid motors, and in particular is directed to the provision of an improved motor for operating windshield wipers or other automotive vehicle accessories.

Principal objects of the present invention are to provide an improved fluid motor of the above generally indicated class, which is economical of manufacture, simple in construction, and reliable and positive in operation; to provide such a motor especially adapted for but not necessarily limited to operation in response to fluid pressures in excess of atmospheric pressure; to provide such a motor embodying improved means for bringing the motor to rest at a predetermined point in the operating stroke thereof; to provide such a construction particularly characterized in that the stop control mechanism, which may be preset for operation independently of the position or direction of motion of the movable element of the motor, operates to shut off the supply of power to the motor when a predetermined point in the operating stroke thereof is reached; to provide such a construction wherein the stop control device reliably operates to bring the motor to rest at one limit of its stroke; to provide such a construction in which the stop control valve is under the control of an operator which also serves to operate a part of the reversing valve mechanism for the motor; and to generally improve the construction and operation of motors of the above generally indicated class.

With the above as well as other objects in view, which appear in the following description and in the appended claims, a preferred but illustrative embodiment of the invention is shown in the accompanying drawing, throughout the several view of which corresponding reference characters are used to designate corresponding parts and wherein:

Figure 1 is a fragmentary view in elevation of a fluid motor embodying the invention;

Fig. 2 is a view in longitudinal section through the motor;

Fig. 3 is a view in transverse vertical section, taken along the line 3—3 of Fig. 1;

Fig. 4 is a fragmentary detailed view in section, taken along the line 4—4 of Fig. 1; and, Fig. 5 is a fragmentary view taken along the line 5—5 of Fig. 1.

It will be appreciated from a complete understanding of the invention that in its generic aspects, the present improvements may be embodied in fluid motors intended for widely differing purposes, and also may be embodied in fluid motors adapted for operation either in response to pressures lower than atmospheric pressure or in response to pressures in excess of atmospheric pressure. Preferably, however, the present motor is used in connection with a vehicle accessory system of the type disclosed and claimed in the co-pending application of applicants, Serial No. 263,723, filed March 23, 1939. In the co-pending application, the vehicle accessory system comprises in general an engine driven compressor adapted to deliver air or other fluid in a variable quantity, depending upon demand, but at a substantially uniform pressure. The vehicle accessories specifically disclosed in the co-pending application include a fluid pressure operated fuel pump which is adapted to deliver fuel from the usual vehicle fuel tank to the carburetor, and a fluid pressure operated windshield wiper motor adapted to operate one or more wipers. The present motor is especially designed to replace the fluid wiper motor specifically shown in the co-pending application.

Referring particularly to the drawing, the wiper motor, designated as a whole as 10, comprises generally an elongated cylindrical member 20, the ends whereof are closed by removable members such as 70. The cylinder 20 slidably receives a piston made up of a pair of piston elements 24 and 26, which are connected together by a web 28, having rack teeth 30 formed in the upper surface thereof.

The cylinder 20 is provided intermediate its ends with an inwardly extending boss portion 32, which forms a bearing for the motor shaft 34, the outer end whereof projects outwardly from the motor and is adapted for connection to a suitable operating element (not shown) which may be operatively associated in any desired manner with the element to be operated by the motor 10. The shaft 34 is provided with a gear segment 36 which is in continual meshing relation with the previously mentioned rack teeth 30, so that the reciprocating movements of the motor piston are translated into oscillatory movements of the wiper shaft 34. The housing 20 is also provided intermediate its ends, with a radially outwardly and upwardly extending boss structure 40, the forward face whereof is recessed to define a valve chamber 42. A cover plate 44 is removably secured to the outer face of the boss 40, and is retained in place thereon by means of a plurality of studs, such as 46. The top of the boss is machined or otherwise finished to cooperate with a supporting member such as 48, by which the motor may be mounted in desired relation to the associated vehicle. The member 48 also forms a closure for the recess in which the segment 36 is received.

The chamber 42 is connected to the supply line 43 through a bore 45. Bore 45 in turn is provided with the hereinafter described stop control valve 47, which occupies the open position during operation of the motor, but which is automatically closed, as described below, to stop the motor.

In the present instance, the means for effecting the automatic reversal of the motor comprises a relay valve 50, and a fluid pressure operated main valve 52, both whereof are positioned within the chamber 42. The relay valve 50 is provided with actuating members 53 and 55. The member 53 is of generally yokelike form, having arms 54 and 56, and is pivoted on a boss 63 which projects from the body 32 and surrounds the inner reduced end 57 of the wiper shaft 34. The member 55, which also serves as the stop control cam, is fixed on the reduced end of the shaft 34 and is provided with a finger 59 which can alternately engage the arms 54 and 56 and rock the member 53 between its respectively opposite positions. With this relation, it will be appreciated that, as the shaft 34 approaches the respective limits of its oscillatory movements, the finger 59 on the stop control cam 55 engages one or the other of the arms 54 and 56 and rocks the yoke 53 between the righthand position in Fig. 1 and a corresponding lefthand position. A spring 58 is seated over the reduced end 57 of shaft 34 and acts to maintain the members 53 and 55 in place thereon. A gasket 61 is seated between the stop cam 55 and the end of the boss 63, and serves to prevent leakage from the chamber 42 along the shaft 34.

The relay valve 50 also includes a valve element 60, which is slidable on a valve seat formed therefor on the base of the valve recess 42, and the back of which is received in an opening provided therefor in the member 53. The valve element 60 is provided with a recess on its inner face, which cooperates with a series of three ports 62, 64, and 66, which open through the valve seat. The valve element 60 is shown in Fig. 1 in its righthand position in which it exposes the port 66 and covers the ports 64 and 62. In the lefthand position thereof, the valve element 60 exposes the port 62 and covers the ports 64 and 66.

As most clearly appears in Fig. 3, the central port 64 opens into the interior of the housing 20 between the two piston elements, which area is vented to the atmosphere through a port 68 (Fig. 2). The port 62 communicates, through a passage 72, with a small chamber space 76 associated with the right hand end of the piston element 75 of the main valve 52; and port 66 communicates, through passage 74, with a similar operating chamber 78 at the lefthand of the piston element 75. It will be understood, accordingly, that when the valve 50 is in the position shown in Fig. 1, the valve chamber 76 is connected to the atmosphere through the passage 72 and ports 62 and 64. At the same time, the valve chamber 78 is connected to pressure through the passage 74, port 66, and chamber 42. Under these conditions, valve 52 is forced to its illustrated righthand position.

The main valve 52 comprises the previously mentioned piston element 75 which is of cylindrical form, and slidable between the righthand position shown in Fig. 1 to a corresponding lefthand limit position. As most clearly appears in Fig. 5, the main valve piston 75 is provided with a recess 82 intermediate its ends, which receives a valve element 84. The valve element 84 is urged into seating relation to its seat 86, within chamber 42, by means of a spring 88, and is provided with a recess 90 which is adapted to bridge two of the three associated ports 92, 94, and 96. The central port 94 opens directly to atmosphere through the previously mentioned space between the two main motor piston elements 26 (Fig. 2). The ports 92 and 96 open into the cylinder 20 at the respectively opposite ends of the piston elements through passages 93 and 95, respectively. With this relation, it will be understood that when the valve element 84 is in the position shown in Fig. 5, it bridges ports 94 and 96, and thus connects the chamber space to the right of piston element 26 to atmosphere. At the same time valve element 84 exposes port 92, which opens directly into the main supply chamber 42, and thus connects the chamber space to the left of piston element 26 to pressure. In the opposite position of valve element 84, the reverse relation, of course, obtains.

In the present embodiment, the stop control comprises the previously mentioned valve 47, which, as is most clearly shown in Fig. 4, is mounted for axial sliding movement in the bore 45 provided therefor in the motor casing. The valve 47 is movable between a closed or stop position (Fig. 4) and an open or operating position to the left of the illustrated position. The valve 47 is provided with a biasing spring 100 which continually urges it to the right, but the valve may be withdrawn from the illustrated stopping position to the open or operating position by means of the operator 102. The operator 102 is provided with a cam finger 104 which is received in a recess formed in the body of the valve, and it will be understood that upon rotation of the operator 102, the finger 104 bears against the shoulder 106 formed on the valve 47, and forces the valve to the left, thus separating the valve element 108 from the valve seat 110.

The valve 47 is provided with a push rod 112 which extends into the previously mentioned main valve chamber 42 and is disposed for engagement by the previously mentioned stop control cam 55. With the parts positioned as shown in Fig. 1, in which the motor pistons are at the lefthand limit of their stroke, the stop control cam is in such position as to enable the valve to be projected to its fully closed position. Except when the motor is at its limit or stopping position, however, the dwell portion of the stop control cam 55 is in position to engage the valve push rod and hold the latter in an open position.

The operator 102 may, of course, extend to any convenient operating point, such as the instrument panel of the vehicle, and may be manually operated from the stopping position of Fig. 4 to a running position in which finger 104 holds the valve 47 in the open position.

Considering the operation of the motor as a whole, the parts are shown in the various figures with the motor pistons at their lefthand limit of travel, with the relay valve 50 in its righthand position, with the main valve 52 in its righthand position, and with the stop valve 47 in the closed position. The fluid circuits are thus in readiness to cause the motor pistons to move to the right as viewed in Fig. 2, and assuming it is desired to start the motor, the operator 102 may be actuated to open the valve 47, thus admitting pressure to the chamber 42. This latter action applies operating pressure to the lefthand end of the piston element 26, and, initiates a rightward movement thereof.

As the motor piston element 26 approaches the righthand limit of travel, the finger 59 on the stop control cam 55 engages the finger 56 on the valve member 53, thus throwing the member 53 from the righthand position shown in Fig. 1 to the lefthand position. This action exposes the ports 62, thus connecting the righthand valve operating chamber 76 to pressure, and, by way of ports 62, thus connecting the righthand valve operating chamber 78 to exhaust. Upon completion of these fluid connections, the main valve 52 is forced from the righthand position shown in Figs. 1 and 5 to the lefthand limit position in which the valve element 84 covers ports 92 and 94, and exposes the port 96. This action connects the space to the righthand side of the main piston element 26 to pressure and connects the chamber space at the lefthand side thereof to exhaust. Accordingly, the motor piston element is now caused to move to the left. As the valve motor piston element 26 approaches its lefthand limit of travel, the finger 59 on the stop control cam 55 engages the finger 54 on member 53 and throws the latter to the position shown in Fig. 1. This action, in turn, actuates valve 52 to its illustrated position, thus restoring the circuits for rightward movement of the motor.

As long, accordingly, as the stop control valve 47 is maintained in its open position, the motor piston element 26 continuously reciprocates between the above-mentioned lefthand and righthand limit positions, each arrival of the motor at a limit position producing a reversal in position of the relay valve 50 and a consequent reversal in the position of the main valve 52, which latter action causes a reversal in direction of movement of the motor.

Assuming it is desired to bring the motor to a stop, the operator 102 may be turned to the stopping position, shown in Fig. 4, which action relieves the valve 47 of the holding effect of the control finger 104, and enables the spring 100, associated with the valve 47, to move the valve to the right until such a time as the valve rod 112 engages the periphery of the stop control cam 55. If the motor piston happens to be in the lefthand limit position at the time the operator 102 is turned to the stopping position, the flat 55a of the stop control cam 55 is presented to the valve rod 112, thus enabling the valve 47 to move to its fully closed position, thus shutting off the supply of pressure to the valve chamber 42 and consequently to the motor piston element 26.

Under normal conditions, it is to be expected that the operator 102 will be moved to the stopping position when the motor piston element 26 is at some position other than the just mentioned lefthand limit position. Under such circumstances, the rightward movement of the valve 47 towards its closed position is interrupted by the engagement of the end of the valve rod 112 with the dwell portion 55b of the stop control cam 55. The cam 55 thus serves to hold the valve 47 in the open position. Assuming the just-mentioned operation occurs while the motor is moving to the right, it will be appreciated that the reversal of the motor at its righthand limit position occurs in the usual way. As the motor approaches its lefthand limit of travel, however, the dwell portion 55b of the stop control cam 55 passes out of range of the valve rod 112, thus enabling the valve 47 to move to the fully closed position, shown in Figs. 1 and 4. The latter action is timed, by reason of the proportioning of the flat and dwell portions of the cam 55, to occur simultaneously with the arrival of the motor piston 26 at the lefthand limit of travel. As described above, the movement of the stop valve 47 to the closed position shuts off the power from the motor and brings the motor to rest at the lefthand limit.

The movement of the stop valve 47 to its stopping position occurs very slightly after the movement of the finger 59 on the cam 55 into engagement with the finger 54 on the valve operating member 53. The shutting off of the motor, therefore, does not interfere with the movement of the relay valve 50 to the position shown in Fig. 1, in which it is in condition for rightward travel of the motor. The movement of the relay valve 50 to the position shown in Fig. 1 completes circuits as previously described, which cause the main reversing valve 52 to move to the position shown in Fig. 5, in which it is also in condition for rightward movement of the motor. Although the power is shut off from the motor, it is to be expected that the residual pressure existing within the chamber 42 will be sufficient to force the valve 52 to the illustrated position. If not, however, such valve 52 is forced to its illustrated righthand position immediately upon reopening the stop valve 47 in restarting the motor.

In the illustrated arrangement, the stop control valve 47 is provided with a flat seat so that only a single operating speed for the motor is provided. If desired, of course, the valve 47 may be provided with a tapered seat or may be otherwise arranged so that the operator 102 may be manipulated so as to provide a plurality of different running speed positions.

Although only a single embodiment of the invention has been described in detail, it will be appreciated that various modifications in the form, arrangement, and number of parts may be made within the spirit and scope of the invention.

What is claimed is:

1. In a fluid motor having first and second members relatively movable through a predetermined stroke under the influence of a fluid pressure differential, means for admitting fluid pressure to and exhausting fluid pressure from said motor including a fluid passage, a first reversing valve means actuated by and in accordance with the relative movements of said members, a second valve means operably responsive to an operation of said first valve means for reversing said fluid pressure differential, and means rendered effective by a part of one of said valve means for closing said passage so as to stop said motor.

2. In a fluid motor having first and second members relatively movable through a predetermined stroke under the influence of a fluid pressure differential, means for admitting fluid pressure to and exhausting fluid pressure from said motor including a fluid passage, means for reversing said fluid pressure differential as said members approach the respective limits of said stroke, a valve for controlling said passage, a manually operable member for opening said valve, cam means responsive to the position of said members and effective to hold said valve in the open position except as said members approach a limit of said stroke, and means rendering said cam means effective to operate said reversing means.

3. In a fluid motor having first and second members relatively movable through a predetermined stroke under the influence of a fluid pressure differential, means for admitting fluid pressure to and exhausting fluid pressure from said motor including a fluid passage, a valve for controlling said passage, cam means directly responsive to the position of said members and operative to control said valve, and reversing means actuated by said cam means for reversing said fluid pressure differential, said reversing means including a member engageable and movable by said cam means as said members approach the respective limits of said stroke.

4. In a fluid motor having first and second members relatively movable through a predetermined stroke under the influence of a fluid pressure differential, means for admitting fluid pressure to and exhausting fluid pressure from said motor including a fluid passage, a first reversing valve means actuated by and in accordance with the relative movements of said members, a second valve means operably responsive to an operation of said first valve means for reversing said fluid pressure differential, and means rendered effective by a part of said first reversing valve means for closing said passage so as to stop said motor.

FRANK W. KNOTT.
BERNT GARLLUS.

CERTIFICATE OF CORRECTION.

Patent No. 2,280,588.  April 21, 1942.

FRANK W. KNOTT, ET AL.

It is hereby certified that error appears in the printed specification of the above numbered patent requiring correction as follows: Page 3, first column, line 14, for "ports 62, thus connecting the righthand" read --the valve element 60, connects the lefthand--; and that the said Letters Patent should be read with this correction therein that the same may conform to the record of the case in the Patent Office.

Signed and sealed this 23rd day of June, A. D. 1942.

(Seal)

Henry Van Arsdale,
Acting Commissioner of Patents.